UNITED STATES PATENT OFFICE.

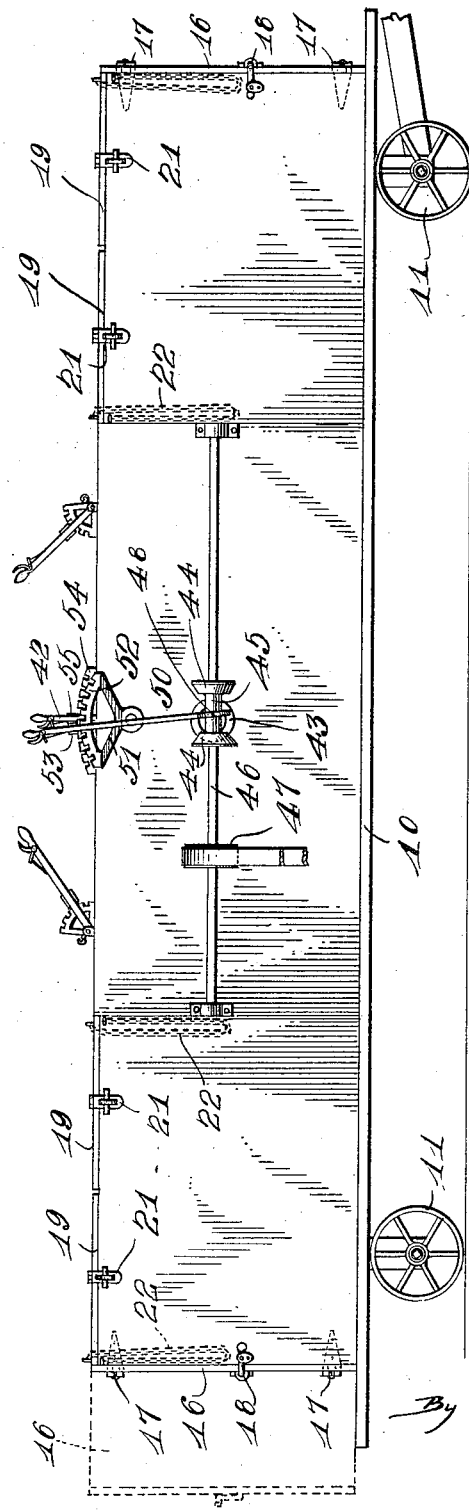

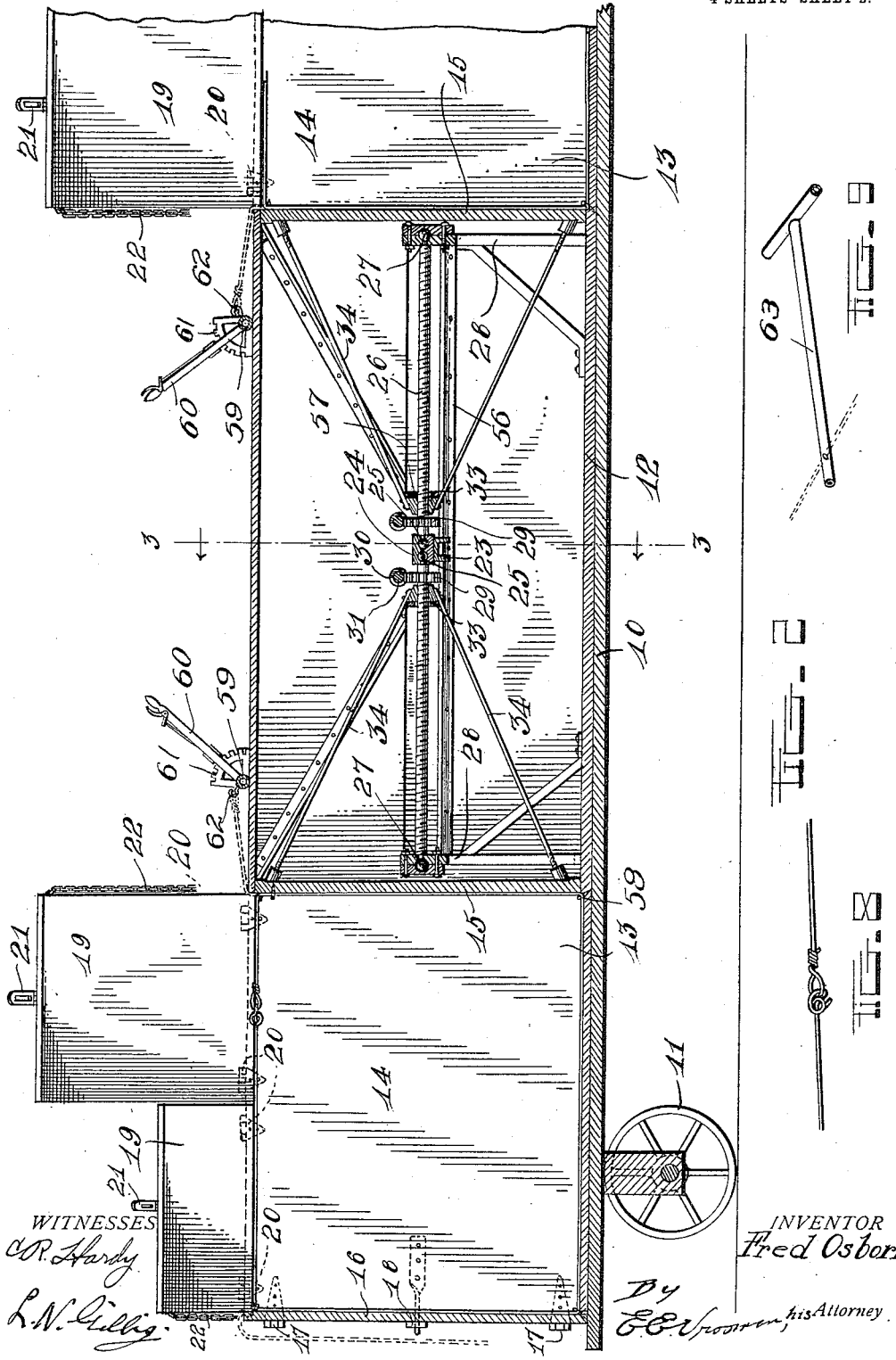

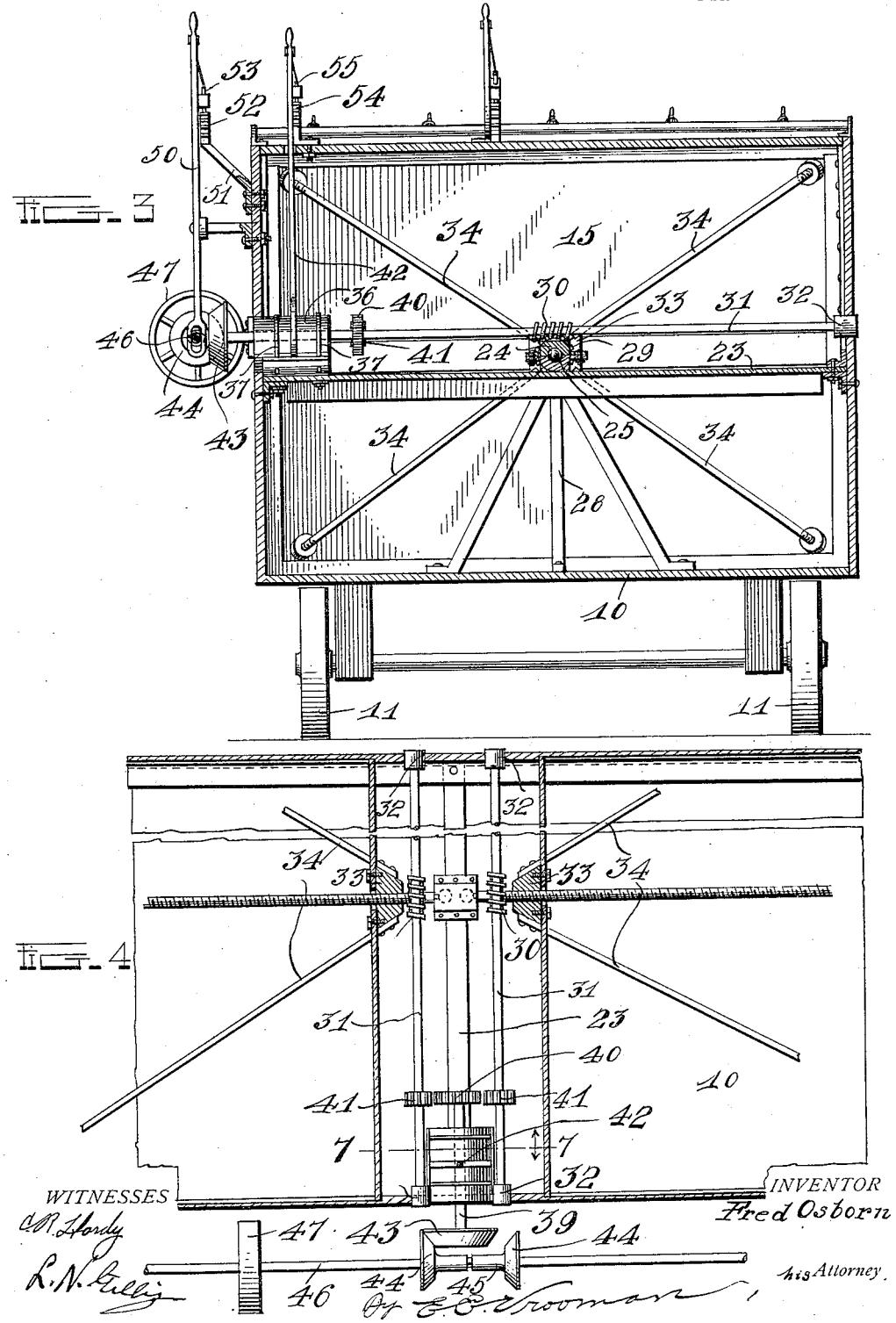

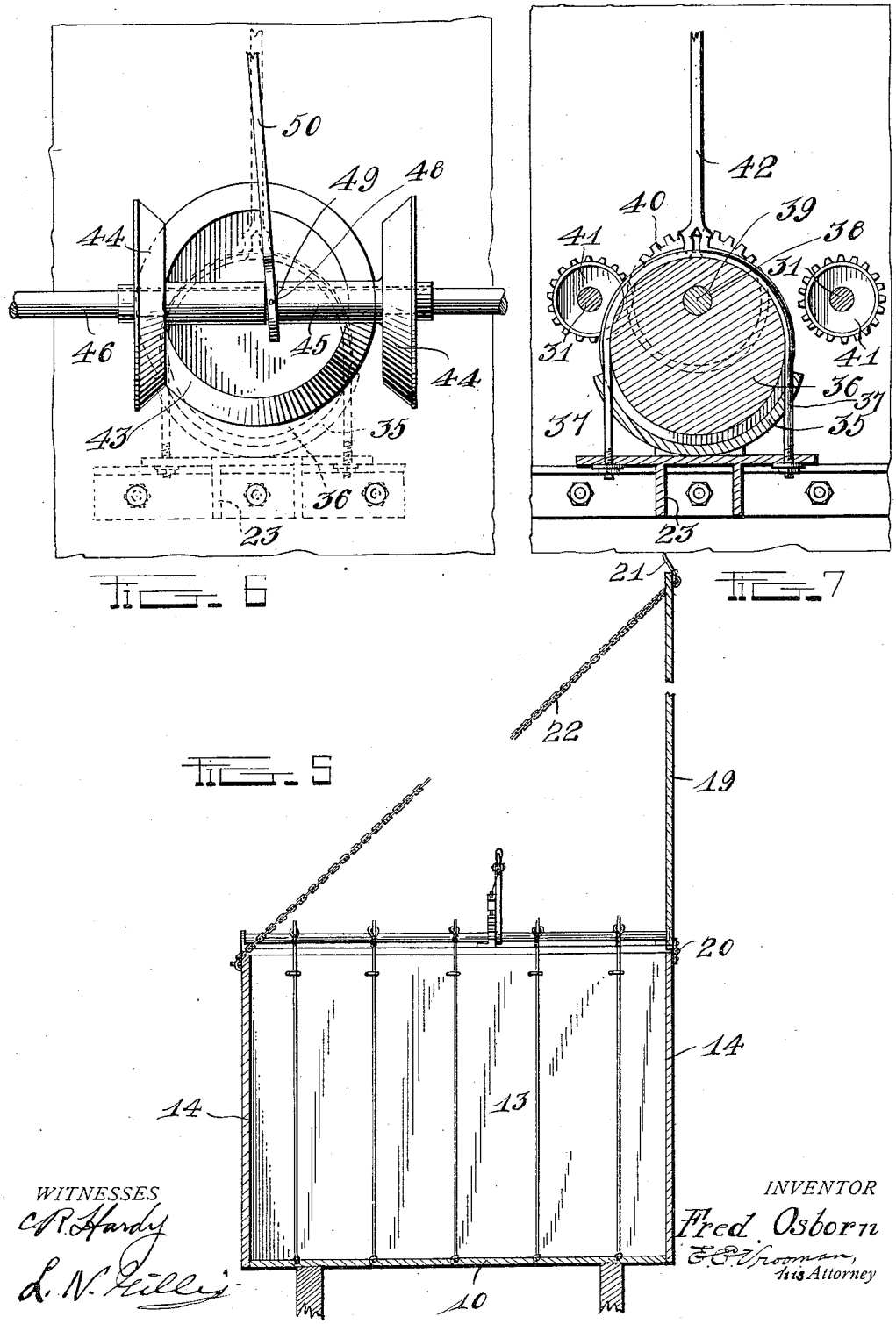

FRED OSBORN, OF FORT COBB, OKLAHOMA.

CORN-BALER.

1,052,944. Specification of Letters Patent. Patented Feb. 11, 1913.

Application filed July 13, 1912. Serial No. 709,224.

*To all whom it may concern:*

Be it known that I, FRED OSBORN, a citizen of the United States, residing at Fort Cobb, in the county of Caddo and State of Oklahoma, have invented certain new and useful Improvements in Corn-Balers, of which the following is a specification, reference being had therein to the accompanying drawing.

This invention relates to baling machines and has special reference to a machine for baling broom corn.

The principal object of the invention is to improve and simplify the general construction of machines of this character.

A second object of the invention is to provide a machine having a pair of baling chambers arranged to be alternately used in the baling operation, the machine being of improved character.

With the above and other objects in view, the invention consists in general of certain novel constructions, combinations and arrangements of parts as will be hereinafter fully described, illustrated in the accompanying drawings, and specifically claimed.

In the accompanying drawings, like characters of reference indicate like parts in the several views, and: Figure 1 is a side elevation of a baler constructed in accordance with this invention. Fig. 2 is an enlarged detail section taken vertically through the baler. Fig. 3 is a section on the line 3—3, Fig. 2. Fig. 4 is a detail plan view partly in section disclosing the central portion of the baler. Fig. 5 is a detail transverse section through one of the baling chambers. Fig. 6 is an enlarged detail view of certain friction gears used in connection herewith. Fig. 7 is an enlarged detail section on the line 7—7, Fig. 4. Fig. 8 is a perspective view showing the manner of connecting the securing wires. Fig. 9 is a perspective view of a tightener stick used herewith.

This baler comprises a platform 10 suitably supported on wheels 11 in order that the baler may be moved from place to place. On this platform is carried the press proper which is provided with the bottom member 12 extending from end to end of the press. At each end of the bottom member there is provided a baling chamber 13 and each of these baling chambers consists of side walls 14 between which moves a head or plunger 15. The wall opposite the head or plunger is indicated at 16 and is provided with hinges 17 on one vertical edge and with a suitable latch 18 on the edge opposite to the hinged edge. The chamber is furthermore provided with doors 19 at the top thereof so that the material in the chamber may be prevented from being forced upward during compression. These doors are provided with hinges 20 at one edge and with the latches 21 similar to the arrangement of the end door 16 previously described. These doors are limited in movement by suitable chains 22 each of which has one end attached to the door and the other end to an eye on the side wall of the press.

Extending across the central part of the baler is a support 23 whereon is mounted a bearing 24 having suitable spherical sockets therein for the reception of balls 25 on the ends of a pair of screws 26 which extend in opposite directions from the bearing 24 and have their opposite ends carried in suitable bearings 27 mounted on supports 28. On each of these screws is fixed a worm wheel 29 wherewith meshes a worm 30 carried on a shaft 31, the latter being supported in suitable bearings 32 arranged in the side walls of the machine. On each of the screws 26 is a nut 33 wherethrough extend braces 34 which have their opposite ends connected with the respective head 15. On the support 23 is mounted a cradle 35 wherein is rotatably supported a block 36, the latter being held to the cradle by means of suitable clamping shafts 37. In the block 36 is a bearing opening 38 wherethrough passes a shaft 39 carrying upon one end a gear 40 which is adapted to mesh with either of a pair of gears 41 secured to the shafts 31. Attached to the block 36 is a lever arm 42 by means of which the blocks may be rotated in the cradle so as to move the shaft 39 to one side or the other and thus bring the gear 40 into mesh with the desired gear 41. On the other end of this shaft 39 is a beveled friction gear 43 which is adapted to mesh with one or the other of a pair of inwardly facing beveled gears 44 mounted on a sleeve 45. This sleeve 45 is splined upon a drive shaft 46 and a belt pulley 47 is provided for connection by means of a belt to any suitable power means. In the sleeve 45 is a groove 48 in which engages the pins 49 of a shipper lever. Mounted on a suitable bracket 51 which is secured to the side of the press is a quadrant 52, and the lever 50 is provided with a latch 53 to engage the quadrant and hold the lever in adjusted position. In like manner the quadrant 54 mounted on the press is engaged by the latch 55 of the lever 42. In the operation of this portion of the device, when it is desired to produce a bale of broom corn one of the chambers 13 is filled with corn. The driving shaft 46 is then started and the gears 43 and 40 brought into mesh respectively with one of the gears 44 and the gear 41 for the particular baling chamber which it is wished to use. This will cause the rotation of the screw 26 pertaining to that chamber and will force the head 15 inward so as to tightly compress the contents of the chamber. When the contents of the chamber have been compressed the doors 16 and 19 may be opened to allow the removal of the bale. The sleeve 45 is then shifted to bring the other gear 44 into engagement with the gear 43 and the head retracted to its original position. During this time the remaining chamber may be then loaded and as soon as the head of the first chamber is in retracted position the gears are shifted to actuate the remaining head and press, the second baling operation thus being substantially continuous.

In order to properly guide the nuts 33 and keep the same from turning there is provided at each side of the machine guide rails 56, and slidable on these guide rails are cross heads 57 to which the nuts are secured. In tying the wire around the bale after the same has been compressed I employ a series of hooks 58 wherethrough the wire runs, the hooks being located in convenient positions. Mounted on the top of the central portion of the device is a rotatable shaft 59 carrying a latch lever 60 which works over a quadrant 61 and on this shaft are a series of hooks 62 wherewith the ends of the wire engage. Now, as the plungers move forward the wires are drawn over the edge by reason of having their ends held until the bale is entirely formed. Then the respective wires are brought together and tightened by means of a suitable tightener stick 63, as shown in Fig. 9, the wire ends assuming the position shown in Fig. 8.

Having thus described the invention, what is claimed as new, is:—

1. In a baling press of the character described, a movable head, and means to move said head comprising a screw, a nut on said screw, a connection between said nut and head, a worm wheel on said screw, a shaft journaled to extend across said screw, a worm on said shaft meshing with the worm wheel, a gear on the worm shaft, a second shaft, a bearing for said second shaft mounted eccentrically on the shaft, a gear on the second shaft adapted to mesh with the gear on the worm shaft, and means to rotate said bearing and bring said gears into mesh.

2. In a baling press of the character described, a movable head, and means to move said head comprising a screw, a nut on said screw, a connection between said nut and head, a worm wheel on said screw, a shaft journaled to extend across said screw, a worm on said shaft meshing with the worm wheel, a gear on the worm shaft, a second shaft, a bearing for said second shaft mounted eccentrically of the shaft, a gear on the second shaft adapted to mesh with the gear on the worm shaft; means to rotate said bearing and bring said gears into mesh, a driving shaft, a beveled gear on the second shaft, a sleeve on the driving shaft, a pair of beveled gears on said sleeve, and means to move the sleeve along the driving shaft to bring one of said beveled gears into engagement with the beveled gear on the second shaft.

In testimony whereof I hereunto affix my signature in presence of two witnesses.

FRED OSBORN.

Witnesses:
MARGARET BURKET,
OSSIE GOIENS.

Copies of this patent may be obtained for five cents each, by addressing the "Commissioner of Patents, Washington, D. C."